Dec. 13, 1960 G. F. ABBOTT, JR 2,964,735

ELECTRONIC SELECTOR CIRCUIT

Filed Aug. 14, 1957 2 Sheets-Sheet 1

INVENTOR
G. F. ABBOTT, JR.
BY Harold C. Herman
ATTORNEY

Dec. 13, 1960 G. F. ABBOTT, JR 2,964,735

ELECTRONIC SELECTOR CIRCUIT

Filed Aug. 14, 1957 2 Sheets-Sheet 2

INVENTOR
G. F. ABBOTT, JR.
BY
Harold C. Herman
ATTORNEY

United States Patent Office 2,964,735

Patented Dec. 13, 1960

2,964,735

ELECTRONIC SELECTOR CIRCUIT

George F. Abbott, Jr., Pearl River, N.Y., assignor to Bell Telephone Laboratories, Inc., New York, N.Y., a corporation of New York Filed Aug. 14, 1957, Ser. No. 678,099

11 Claims. (Cl. 340—168)

This invention relates to a selector circuit, and more particularly to a high speed selector circuit which establishes a selection preference and provides a number of electrical impulses in accordance with the selection.

In many systems, such as telephone systems, switching systems and computer systems, it is often necessary to select one of a number of available selectable elements in accordance with a definite preference pattern and then to supply an indication of the selection. For example, in the telephone trunk selecting system disclosed in Patent No. 2,853,554 issued to C. E. Brooks et al. on September 23, 1958, an idle trunk is selected for establishing a connection to a subscriber line. A preference selection for selecting the trunks is established with the selected trunk being the preferred idle trunk which is connectable to the subscriber line. After the trunk is selected, an indication of the selection is provided in order to complete the establishment of a connection from the subscriber line through the selected trunk.

An object of this invention is to provide a high speed selector circuit for determining the availability of a number of selectable elements, establishing a preference for selecting the available selectable elements, and then providing a pulsed indication of the preferred available element.

In accordance with one specific embodiment of this invention, a high speed selector circuit is disclosed which has one stage for each of the selectable elements. Each stage includes a flip-flop circuit and two gate circuits. One of the gate circuits is controlled by the condition of the associated selectable element and the other of the gate circuits is controlled by the condition of its associated flip-flop circuit. If a selectable element is unavailable for selection, its associated gate circuit is enabled. For example, if the high speed selector circuit of this invention is utilized for selecting telephone trunks in a system of the type described in the above-identified patent of Brooks-Joel-Krom, the trunks would be the selectable elements and a busy trunk would provide for enabling its associated gate circuit.

A feature of this invention relates to the gating means associated with each stage of the selector circuit for determining the availability for selection of the selectable element associated with the stage.

The stages are connected in a preference chain, with the first stage being first preferred, the second stage being second preferred, etc. When a selectable element is available for selection, its associated gate circuit is disabled. Each disabled gate circuit functionally breaks the chain of stages. When a selection is desired, a start pulse is provided to the flip-flop circuit of the first stage in the preference chain. If the selectable element associated with the first stage is unavailable, the associated gate circuit in the first stage is enabled to permit the flip-flop circuit of the first stage to trigger or set the flip-flop circuit of the second stage. The gate circuits enabled by the unavailable selectable elements, in this manner, cooperate with the flip-flop circuits to form a self-propagating chain. Each flip-flop circuit triggers the next flip-flop circuit through the enabled gate circuit and resets the preceding flip-flop circuit. The self-propagation is halted at the first disabled gate circuit to indicate the selection of the preferred available element. In this manner, a preference is established as the self-propagation is halted at the first disabled gate circuit in the chain.

Another feature of this invention pertains to the gating means controlled in accordance with the condition of the selectable elements for connecting the flip-flop circuits in a self-propagating chain.

After the preference selection is completed, the second set of gate circuits cooperates with the flip-flop circuits to form a shift register circuit to provide a number of pulses which identifies the selected stage. Actually, the number of pulses that are provided equals the number of stages in the chain after the selected stage. For example, if the chain includes ten stages and the fourth stage in the chain is selected, six pulses are provided during the shift register operation. The selectable elements and stages are identified by numbers running from 1 for the least preferred element and last stage in the chain so that the preference is in the inverse order as would be indicated by the magnitude of the identifying digit. The number of pulses provided by the shift register operation corresponds to the identity of the selected element.

Still another feature of this invention relates to the dual function of the flip-flop circuits in the high speed selector circuit which is to select a preferred selectable element which is in condition for selection and to supply a number of pulses which indicates the identity of the selected element.

A further feature of this invention relates to connecting a set of flip-flop circuits both in a self-propagating chain and in a shift register chain by means of two sets of gate circuits.

Still a further feature of this invention relates to the provision of two sets of gate circuits which are associated with one set of bistable flip-flop circuits so that both preference selection and pulse generation are achieved thereby.

Still a further feature of this invention pertains to means for determining that all of the selectable elements are unavailable for selection and for providing an indication in accordance therewith.

Further objects and features will become apparent upon consideration of the following description taken in conjunction with the drawings wherein.

Figure 1:
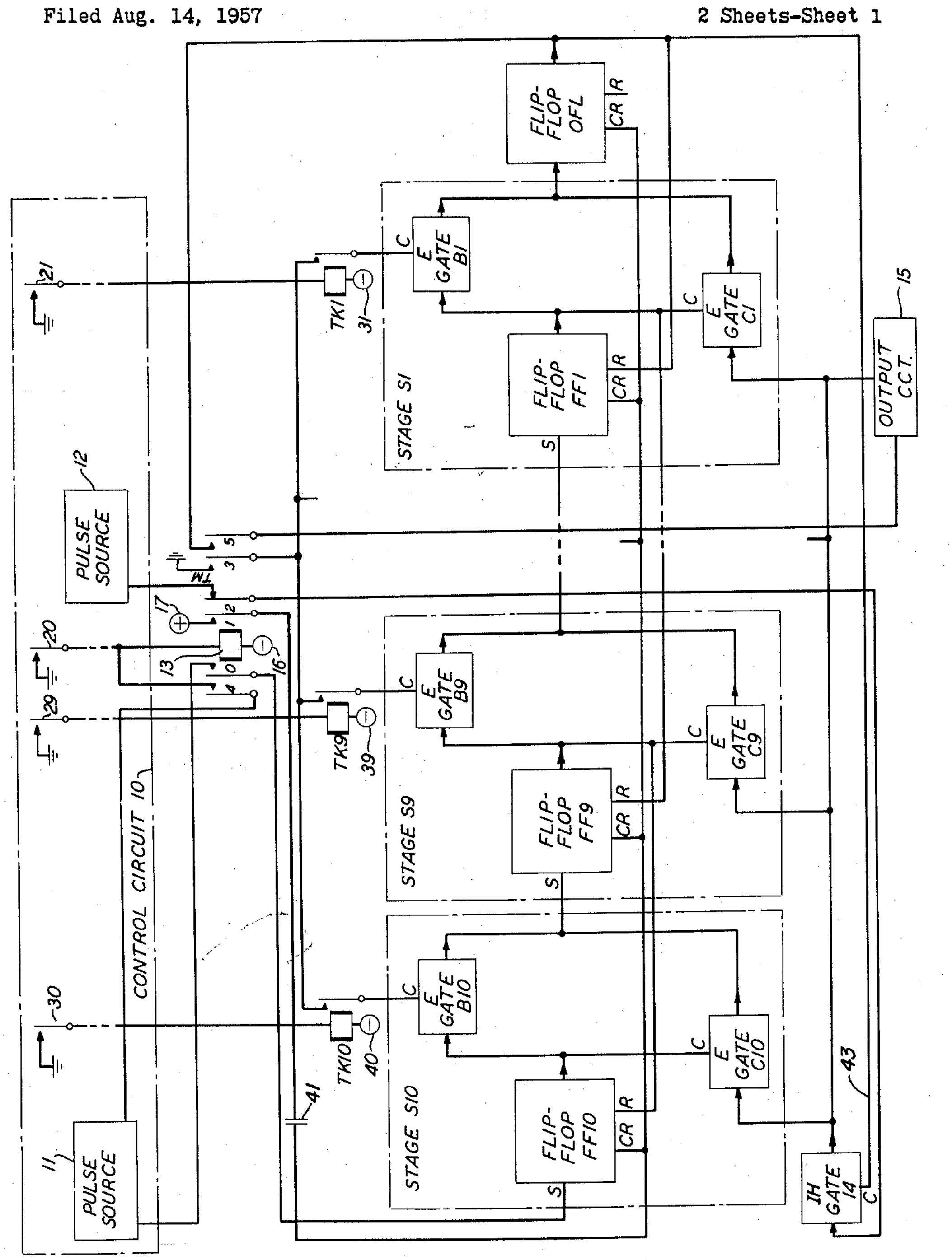
Fig. 1 is a combined circuit and functional representation of the high speed selector circuit of this invention.

Referring to Fig. 1, the high speed selector circuit of this invention includes ten stages S1–10 which are connected in a chain. The stages S1–10 include, respectively, the bistable flip-flop circuits FF1–10, the enabling gate circuits B1–10 and the enabling gate circuits C1–10. As is hereinafter described, the flip-flop circuits FF1–10 and the enabling gate circuits B1–10 form a self-propagating chain and the flip-flop circuits FF1–10 and the enabling gate circuits C1–10 form a ten-stage shift register. The operation of the stages S1–10, both for the self-propagating chain and shift register sequences of operations, is controlled by an input or control circuit 10.

The input or control circuit 10 includes two pulse sources 11 and 12 and armatures 20 through 30 for controlling the operation of the ten stages S1–10. The armatures 21–30 are individually operated and released under control of circuits and apparatus, not shown, which may include, by way of example, trunk circuits in a telephone system or any other multicondition circuit or apparatus. Any combination of the armatures 21–30 may be operated at any time and the operation of the armatures 21–30 is independent of the condition of the flip-flop circuits FF1–10 in the stages S1–10.

The armatures 21–30 in the input circuit 10 directly control the operation of individually associated relays TK1–10 as they are connected, respectively, to the windings of the relays TK1–10 which are in turn connected, respectively, to the negative potential sources 31–40. When any one of the armatures 21–30 in the input, or control, circuit 10 operates, it provides, therefore, for the operation of the associated one of the relays TK1–10.

The operation of armature 20 is independent of the operation of the armatures 21–30 and functions to operate the select relay 13 and ready a path for initiating the operation of the pulse source 11. Relay 13 operates when the armature 20 is operated as one end of the winding of the select relay 13 is connected to the armature 20 and the other end to a negative potential source 16. When the armature 20 operates relay 13, it initiates the preference selection sequence of operation. As is hereinafter described, when the armature 20 releases, it initiates the shift register sequence of operations.

When the select relay 13 operates, it connects ground through its operated armature 3 to the contacts associated with the armatures of relays TK1–10. If, for example, the relays TK10 and TK1 are operated when the relay 13 operates, the ground potential is connected to terminal C of the enabling gate circuits B10 and B1. Relays TK10 and TK1, when operated, indicate that their associated selectable elements are unavailable for selection. The other selectable elements associated with the normal relays TK2–9 are available.

Figure 3:
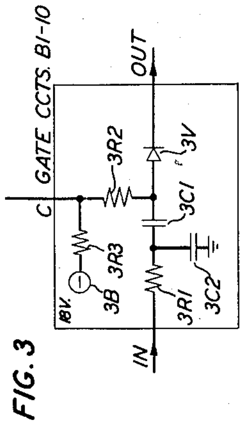
Fig. 3 is a circuit representation of one of two gate circuits included in each stage of the selector circuit of this invention.

As shown in Fig. 3, each of the gate circuits B1–10 has an input terminal, an output terminal and a control terminal C. The control terminal C is normally at a potential of minus 18 volts due to its connection through the resistor 3R3 to the minus 18-volt potential source 3B. The minus 18 volts at terminal C reverse biases a varistor 3V which is connected between the output terminal and a coupling capacitor 3C1. The coupling capacitor 3C1 is connected through a delay network consisting of the resistor 3R1, which is connected to the input terminal, and a capacitor 3C2, which is connected to ground. The capacitor 3C2 and resistor 3R1 provide for a delay of 3 to 5 microseconds.

When ground is connected to terminals C of the gate circuits B10 and B1, the varistors 3V in circuits B10 and B1 are relatively forward biased to allow the passage of positive pulses from their associated input terminals to their associated output terminals.

When relay 13 operates to enable the gate circuits B10 and B1, it also connects a positive potential source 17 through its operated armature 1 to the capacitor 41. The capacitor 41 is connected to a common reset terminal CR of each of the flip-flop circuits FF1–10 and OFL. As is hereinafter described, when a positive pulse is provided to the terminals CR, it resets any of the circuits FF1–10 and OFL which are set. When the select relay 13 operates, it normalizes the circuits FF1–10 and OFL.

When the select relay 13 operates to enable the circuits B10 and B1 and to normalize the circuits FF1–10 and OFL, it closes a start path through its operated armature 4 from the grounded armatures 20 to the pulse source 11, and through its operated armature 0 from the pulse source 11 to the set terminal S of the flip-flop circuit FF10 in the stage S10.

The pulse source 11 in the circuit 10 provides a single positive pulse to the flip-flop circuit FF10 in the stage S10 to trigger a self-propagating chain comprising some of the flip-flop circuits FF1–10. The pulse source 11, which is enabled to supply the start pulse upon the operation of the relay 13, does not supply the start pulse until after the gate circuits B10 and B1 have been enabled.

Figure 2:
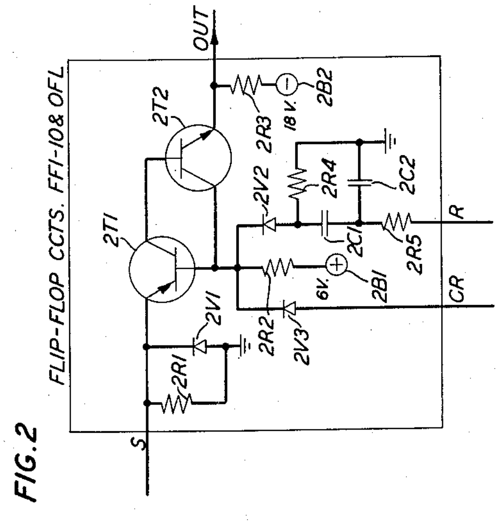
Fig. 2 is a circuit representation of the flip-flop circuit utilized in the selector circuit of this invention.

As shown in Fig. 2, each of the flip-flop circuits FF1–10 and OFL includes a PNP junction transistor 2T1 and an NPN junction transistor 2T2 interconnected in a hook arrangement to provide for a current amplification factor greater than one. Such hook arrangements are described, for example, in Patent 2,655,609 which was issued to W. Shockley on October 13, 1953. The set terminal S is connected to emitter electrode of the transistor 2T1 which is also connected to ground through the varistor 2V1 and the resistor 2R1. The varistor 2V1 functions to shunt negative pulses to ground and the resistor 2R1 functions to bias the emitter electrode with respect to the base electrode. The base electrode of transistor 2T1 is connected to the plus 6-volt potential source 2B1 through the feedback promoting resistor 2R2.

The circuits FF1–10 and OFL are bistable having a low and a high current equilibrium condition. A positive pulse at the set terminal S of the circuit FF10 triggers it to its high current equilibrium condition where it remains until a positive pulse is provided to its common reset terminal CR or its reset terminal R. The common reset terminal CR is connected through the varistor 2V3 to the base electrode of the transistor 2T1, and the reset terminal R is coupled through the delay network consisting of the resistor 2R5 and the grounded capacitor 2C2. The resistor 2R5 and the capacitor 2C2 provide for a delay of 6 to 8 microseconds. The resistor 2R5 is connected through the coupling capacitor 2C1 and varistor 2V2 to the base electrode of transistor 2T1, and the junction between varistor 2V2 and capacitor 2C1 is connected to the grounded resistor 2R4.

When the positive start pulse is provided from the pulse source 11 through the set terminal S to the emitter electrode of transistor 2T1, the flip-flop circuit FF10 is triggered from its low current to its high current equilibrium condition. In the low current equilibrium condition, the transistors 2T1 and 2T2 present a high impedance between the emitter electrode of transistor 2T2 and the base electrode of transistor 2T1 so that the potential at the output terminal of the circuit FF10 is at minus 18 volts due to its connection through the resistor 2R3 to the minus 18-volt potential source 2B2. When, however, the flip-flop circuit FF10 is triggered to its high current equilibrium condition, the transistors 2T1 and 2T2 form a low impedance path from the battery 2B1 to the output terminal so that output potential increases.

The output terminal of each of the flip-flop circuits FF1–10 is connected to the input terminal of the associated one of the enabling gate circuits B1–10 and also to the control terminal C of the associated one of the enabling gate circuits C1–10. The relatively positive potential supplied from the flip-flop circuit FF10 is coupled through the resistor 3R1, capacitor 3C1 and varistor 3V of the gate circuit B10 since the varistor 3V of circuit B10 is relatively forward biased. As described above, the biasing of varistors 3V in the circuits B1–10 is controlled through the respective control terminals C by the relays TK1–10. With relays TK10 and TK1 operated, the varistors 3V in circuits B10 and B1 are forward biased.

The output terminal of each enabling gate circuit B1–10 is connected to the set terminal S of the next or adjacent one of the flip-flop circuits FF1–9 and OFL. The positive potential provided from the flip-flop circuit FF10 is coupled as a set pulse through the enabled gate circuit B10 to trigger or set the flip-flop circuit FF9.

When the flip-flop circuit FF9 is set, it provides a reset pulse to the reset terminal R of the circuit FF10 and it enables the gate circuit C9. The flip-flop circuit FF9 does not set the flip-flop circuit FF8 because the gate circuit B9 remains disabled to break the self-propagating chain. As described above, the circuit B9 is disabled when relay TK9 is normal.

The flip-flop circuit FF9 in the stage S9 remains set, or in its high current condition, until a pulsed indication of the identity of the selected element, not shown, is provided. Stage S9 is, in this manner, selected to indicate the preferred available selectable element. The selectable elements, as described above, are associated individually with the armatures 21–30 in the input circuit 10. The element associated with armature 29 is selected as the preferred available element since stage S9, associated therewith, is the selected stage. The preference established by the stages S1–10 is in the inverse order as the numerical designation of the stages. The selectable element associated with armature 29 is selected because the preferred element asosciated with the armature 30 is unavailable for selection. The preferred available element breaks the chain consisting of the flip-flop circuits FF1–10 and the gate circuits B1–10. Since the preferred available element is associated with circuit B9 only the circuits FF10 and FF9 are successively operated.

If none of the selectable elements is available for selection, all ten armatures 21–30 are operated so that all ten relays TK1–10 are operated and all ten gate circuits B1–10 are enabled. With all ten circuits B1–10 enabled, a start pulse to the set terminal S of the flip-flop circuit 10 causes the ten flip-flop circuits FF10–1 to be successively set and then reset. The start pulse, in this manner, triggers a ten-stage self-propagating chain. When the stage FF1 at the end of the chain is set, it in turn sets the flip-flop circuit OFL. When the flip-flop OFL circuit is set, it provides an overflow indication through the operated armature 5 of relay 13 to the output circuit 15. The circuit OFL functions, therefore, to provide an indication that all the selectable elements are unavailable for selection. As is hereinafter described, the circuit OFL also functions to terminate the shift register sequence of operation which occurs after an element is selected.

As described above, the stages S1–10 provide a pulse indication of the identity of the selected element utilizing the flip-flop circuits FF1–10 and the gate circuits C1–10. The flip-flop circuits FF1–10 and the gate circuits C1–10 form a shift register for providing a number of pulses equal to the numerical designation of the selected element. In the example described above with the flip-flop circuit FF9 remaining set, the numerical designation of the selected element is 9.

In general, a shift register consists of a series of bistable circuits which are interconnected so that a shift or timing pulse applied simultaneously to each circuit causes the information stored in one circuit to transfer or to shift to the next succeeding circuit. In the selector circuit shown in Fig. 1, the shift or timing pulses are supplied from the pulse source 12 in the circuit 10. The source 12 is a continuously operating pulse generator which supplies positive pulses to the contact associated with armature 2 of the relay 13. With relay 13 operated, the path for the pulses from the source 12 is opened. Armature 2 of relay 13 is connected to the inhibiting gate 14 which is, in turn, multipled to the gate circuits C1–10.

Figure 4:
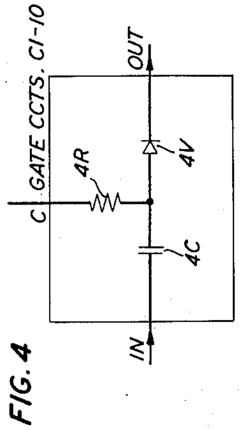
Fig. 4 is a circuit representation of the other gate circuit included in each stage of the selector circuit of this invention.

As shown in Fig. 4, each of the enabling gate circuits C1–10 includes a varistor 4V, a capacitor 4C and a resistor 4R. The resistor 4R, capacitor 4C and varistor 4V are interconnected with the capacitor 4C being connected to the input terminal, the varistor 4V being connected to the output terminal and the resistor 4R being connected to the control terminal C. As described above, the potential supplied to the terminal C of the gate circuits C1–10 is controlled by the associated flip-flop circuits FF1–10. With the associated one of the flip-flop circuits FF1–10 reset, the control potential is at minus 18 volts so that the varistor 4V is normally reversed biased. When the associated one of the flip-flop circuits FF1–10 is triggered, its output potential increases to relatively forward bias the varistor 4V. With the varistor 4V forward biased, a positive pulse supplied to the input terminal is coupled through the capacitor 4C and the varistor 4V to the output terminal.

At the end of the preference selection sequence of operations, the flip-flop circuit FF9 remains set and the gate circuits B10, B1 and C9 are enabled. As is hereinafter described, the inhibiting gate 14 is also enabled to allow the passage of shift pulses from source 12. After an interval sufficient to allow for the completion of the preference selection sequence of operations, the armature 20 in the control circuit 10 is restored to normal to release the select relay 13. When the relay 13 releases, it disables the gate circuits B10 and B1 by disconnecting the ground potential from their control terminals C, and it opens at its armature 0 the start path from the pulse source 11 to the flip-flop circuit FF10 in the stage S10. When the select relay 13 releases, it also completes the path from the timing pulse source 12 through its normal armature 2 to the input of the inhibiting gate 14.

Figure 5:
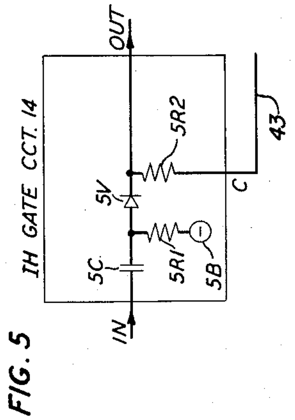
Fig. 5 is a circuit representation of an inhibiting gate circuit included in the selector circuit of this invention.

As shown in Fig. 5, the inhibiting gate 14 includes a varistor 5V which is normally forward biased. The varistor 5V is forward biased because it is connected through a resistor 5R2 and control terminal C to the negative potential source 2B2 in the flip-flop circuit OFL along the inhibit line 43. The circuit OFL is similar to the circuits FF1–10 and as shown in Fig. 2, the negative potential source 2B2 of circuit OFL is connected to its output terminal. The varistor 5V in the gate circuit 14 is also connected to the negative potential source 5B through the resistor 5R1 and to the input terminal of the circuit 14 through the capacitor 5C. With a control potential of minus 18 volts at its terminal C, the inhibiting gate 14 is enabled. When, however, as is hereinafter described, the flip-flop circuit OFL is set, the potential at terminal C of the inhibiting gate 14 is increased to reverse bias the varistor 5V and thereby disable the inhibiting gate 14.

The timing pulses from the pulse source 12 are supplied through the normal armature 2 of relay 13 and the normally enabled inhibiting gate 14 to the input terminals of the gate circuits C1–10 and to the output circuit 15.

As described above, at the completion of the preference selection sequence of operations, the gate circuit C9 is enabled and the gate circuits C1–8 and C10 remain disabled. The first timing pulse through the inhibiting gate 14 is therefore blocked at the gate circuits C1–8 and C10 but passes through the gate circuit C9 to set the flip-flop circuit FF8 in stage S8. The first timing pulse is also supplied to the output circuit 15. When the flip-flop circuit FF8 is set, it enables its associated gate circuit C8 and it resets the flip-flop circuit FF9. When the flip-flop circuit FF9 is reset, it removes the enabling potential from the gate circuit C9.

The next timing pulse is blocked at the gate circuits C1–7 and C9–10 but passes through the enabled gate circuit C8 and also to the output circuit 15. This shifting sequence is continued with one flip-flop circuit after another being set and then reset, and with each timing pulse through the inhibiting gate 14 passing to the output circuit 15. This sequence continues through stages S8–S1 until the flip-flop circuit OFL at the end of the chain of circuits FF10–1 is set. When the flip-flop circuit OFL is set, it discontinues the shifting sequence of operations by disabling the inhibiting gate 14 to block the timing pulses. As described above, when the flip-flop circuit OFL is set, it provides a disabling potential to terminal C of the inhibiting gate 14. When the inhibiting gate 14 is disabled, it also blocks the passage of the timing pulses to the output circuit 15. During the shifting sequence, one pulse is provided to the circuit 15 for each of the circuits FF8–1 and OFL that is set, or 9 in all. In this manner, a number of pulses equal to the numerical designation of the selected element is provided to the output circuit 15.

It is to be understood that the above-described arrangements are illustrative of the application of the principles of this invention. Numerous other arrangements may be devised by those skilled in the art without departing from the spirit and scope of the invention. For example, the number of selectable elements and stages may be increased or decreased. It is evident, therefore, that the above-described arrangement is merely illustrative of the application of the principles of this invention.

What is claimed is:

1. A selector circuit comprising a plurality of bistable trigger circuits arranged in a chain, first means including a plurality of first gate circuits connected between adjacent ones of said trigger circuits for sequentially triggering a predetermined number of said trigger circuits and means for applying input signals selectively to said first gate circuits, second means effective after the operation of said first means and including a plurality of second gate circuits connected between adjacent ones of said trigger circuits for triggering in a step-by-step manner said trigger circuits which were not triggered during the operation of said first means, and means responsive to each operation of said second means for determining the number of trigger circuits sequentially operated by said second means.

2. A high speed selector circuit comprising a plurality of stages arranged in a chain, each of said stages including a bistable circuit having an input and an output terminal, a first gate circuit and a second gate circuit connected between said output terminal of said bistable circuit in said each stage and said input terminal of said bistable circuit in an adjacent one of said stages, said second gate circuit being controlled by the operational state of said bistable circuit in said each stage; control means individually connectable to each of said plurality of stages for controlling said first gate circuits; first means effective after the operation of said control means for successively operating a predetermined number of said bistable circuits wherein said predetermined number is determined by said first gate circuits as controlled by said control means; pulsing means effective after the operation of said first means for simultaneously supplying a series of pulses to each of said second gate circuits in said plurality of stages whereby said bistable circuits not operated by said first means are operated in turn; means connected to and controlled by the last one of said plurality of stages in said chain for disabling said pulsing means; and means controlled by said pulsing means for determining the number of said bistable circuits which are operated during the operation of said pulsing means.

3. A selector circuit comprising a plurality of bistable trigger circuits, first means including a plurality of first gate circuits each connected between the output terminal and the input terminal of adjacent ones of said bistable trigger circuits for arranging said plurality of bistable trigger circuits in a self-propagating chain, means connectable to each of said first gate circuits for controlling the condition thereof, first control means for triggering the first one of said bistable trigger circuits in said chain of bistable trigger circuits whereby a predetermined number of said bistable trigger circuits as determined by said plurality of first gate circuits are triggered, a plurality of second gate circuits each connected between adjacent ones of said bistable trigger circuits, each of said plurality of second gate circuits being controlled by the condition of that one of said plurality of bistable trigger circuits having an output terminal connected thereto, second control means including said plurality of second gate circuits for triggering in turn each of said bistable trigger circuits which were not triggered upon the operation of said first control means; and means responsive to said second control means for determining the number of said bistable trigger circuits triggered in turn by said second means.

4. A selector circuit for first establishing a preference selection and then providing an indication of the selection comprising a plurality of bistable circuits, means including a plurality of first gate circuits for connecting said bistable circuits in a preference selection chain, each of said plurality of first gate circuits being connected between adjacent ones of said bistable circuits as arranged in said chain, a two-state device controlling each of said first gate circuits, a normally disable start pulse source for supplying a start pulse to the first one of said bistable circuits in said chain, means for resetting each of said bistable circuits and for enabling said start pulse source whereby a number of said bistable circuits are set as determined by said plurality of first gate circuits, a plurality of second gate circuits each connected to and controlled by one of said plurality of bistable circuits, pulsing means effective after said number of said bistable circuits are set by said start pulse source for supplying shift pulses to said plurality of second gate circuits, and means connecting each of said plurality of second gate circuits between said pulsing means and said bistable circuit adjacent to that one of said bistable circuits by which it is controlled.

5. A selector circuit for first establishing a preference selection and then providing an indication of the selection comprising a plurality of bistable circuits, means including a plurality of first gating circuits for connecting said plurality of bistable circuits in a self-propagating chain, each of said plurality of first gating circuits being connected between a preceding one and a succeeding one of said bistable circuits as arranged in said self-propagating chain, first means connected to each of said first gating circuits for limiting the operation of said self-propagating chain, means including a plurality of second gating circuits for connecting said bistable circuits in a shift register chain, each of said plurality of second gating circuits being connected between a preceding one and a succeeding one of said bistable circuits in said shift register chain, each of said plurality of second gating circuits being controlled by said preceding bistable circuit, means connected to one of said bistable circuits for initiating the operation of said self-propagating chain whereby one of said bistable circuits is last operated, second means connected to each of said second gating circuits for completing the operation of said shift register chain subsequent to the operation of said self-propagating chain, and means responsive to said second means for counting the number of said bistable circuits operated during the operation of said shift register chain.

6. A preference selector comprising a plurality of transistor bistable circuits equal in number to a maximum number of selectable elements, each of said transistor bistable circuits representing one of said selectable elements and having an output and an input terminal, means including a first plurality of normally disabled diode gates connecting said transistor bistable circuits in a series chain, each of said normally disabled diode gates except one being connected from said output terminal of a particular transistor bistable circuit to said input terminal of an adjacent one of said transistor bistable circuits in said chain, an overflow bistable transistor circuit having an input and an output terminal, said one normally disabled diode gate circuit being connected between said input terminal of said overflow transistor circuit and said output terminal of said transistor circuit at the end of said chain, control means for enabling any combination of said first plurality of normally disabled diode gates, means for operating the first one of said transistor bistable circuits in said chain whereby a number of said transistor circuits are operated, a second plurality of normally disabled diode gates individually connected to and controlled by a particular one of said transistor bistable circuits, a source of enabling pulses, each of said second plurality of normally disabled diode gates connecting said source to that one of said transistor bistable circuits which is adjacent to said particular one of said transistor bistable circuits in said chain, one of said second plurality of normally disabled diode gates connecting said source to said overflow transistor circuit, means effective after the operation of said operating means for initiating the operation of said source, means responsive to the operation of said overflow circuit for halting the operation of said source, and output circuit means connected to said source and operative to receive each of said enabling pulses provided thereby.

7. A selector circuit for establishing a preference selection circuit for establishing a preference selection for a plurality of selectable positions comprising a plurality of bistable circuits, a plurality of first gating circuits, each of said plurality of first gating circuits being connected to an individual one of said plurality of bistable circuits and connecting said individual one to a next adjacent one of said plurality of bistable circuits so as to form a self-propagating counting chain, control means individually associated with each of said plurality of selectable positions, said control means being selectively connected to each of said first gating circuits for limiting the count of said counting chain according to a selectable position, a pulse source, a plurality of second gating circuits each connecting said pulse source to individual ones of said plurality of said bistable circuits, each of said gating second circuits being controlled by the next preceding bistable circuit with respect to said individual one to which it is connected so that said bistable circuits not affected by a selection are stepped along one by one in response to said pulse source, and means responsive to the last one of said bistable circuits upon the operation thereof to disconnect said pulse source from said plurality of second gating circuits.

8. A selector circuit for establishing a preference selection comprising a plurality of bistable circuits, means including a plurality of first gating circuits connecting adjacent ones of said bistable circuits for arranging said plurality of bistable circuits in a sequentially operating counter chain, means for individually controlling each of said first gating circuits to limit the sequential operation of said chain according to a selection, means for operating step by step individual ones of said plurality of bistable circuits unaffected by the sequential operation of said chain, and output means responsive to each operation of said operating means whereby the number of said unaffected ones of said plurality of bistable circuits may be determined.

9. A preferential hunting circuit comprising a plurality of counting circuits adapted for sequential operation upon a selection having to be made, a plurality of control means each individually connected to one of said plurality of counting circuits to selectively restrict the sequential operation thereof, means operative at a predetermined time after the initiation of operation of said hunting circuit to successively trigger one by one that portion of said counting circuits not affected by said control means, and output means responsive to each individual operation of said trigger means for supplying an indication of the number of counting circuits sequentially operated.

10. A preference selector circuit comprising a sequentially operating counting chain having a plurality of counting stages and a control stage, said plurality of counting stages being equal in number to the number of selections which can be made, a plurality of gating circuits each connecting adjacent ones of said counting stages and also said control stage to said last counting stage in said chain, a first pulse source and a second pulse source, means for connecting said first pulse source to the first of said counting stages in said counting chain to initiate a sequential operation thereof, means individual to each of said gating circuits to selectively limit the operation of said counting stages according to the availability of a selection, means operative at a predetermined time after the operation of said connecting means and including said second pulse source for stepping along one by one said counting stages and said control stage not affected by said first pulse source, means responsive to said control stage to disable said stepping means, and an output circuit responsive to each operation of said second pulse source for supplying an indication of the number of stages not included in the limited operation of said counting chain.

11. A preference selector circuit comprising a plurality of counting stages equal in number to the number of selections which can be made, means connecting said plurality of counting stages for sequential operation so that each counting stage upon operation triggers a next subsequent stage and resets a next preceding stage, a plurality of means arranged in preferential order according to selections to be made and each individually connected to one of said plurality of counter stages for selectively limiting said sequential operation to that counter stage associated with a first available one of said means in said preferential order, stepping means including a source of serially arranged pulses connected to each of said counting stages, said stepping means being controlled by individual ones of said counting stages to trigger step by step successive ones of said plurality of counting stages unoperated in said sequential operation, and means responsive to said stepping means for determining the number of step-by-step operations required to trigger said unoperated counting stages whereby the number of counting stages operated in said sequential operation is determined by elimination.

References Cited in the file of this patent

UNITED STATES PATENTS

| | | |
|---|---|---|
| 2,810,098 | Pearce | Oct. 15, 1957 |
| 2,823,856 | Booth | Feb. 18, 1958 |